J. EARNSHAW.
Car for Inclined-Planes.
No. 162,358
Patented April 20, 1875.
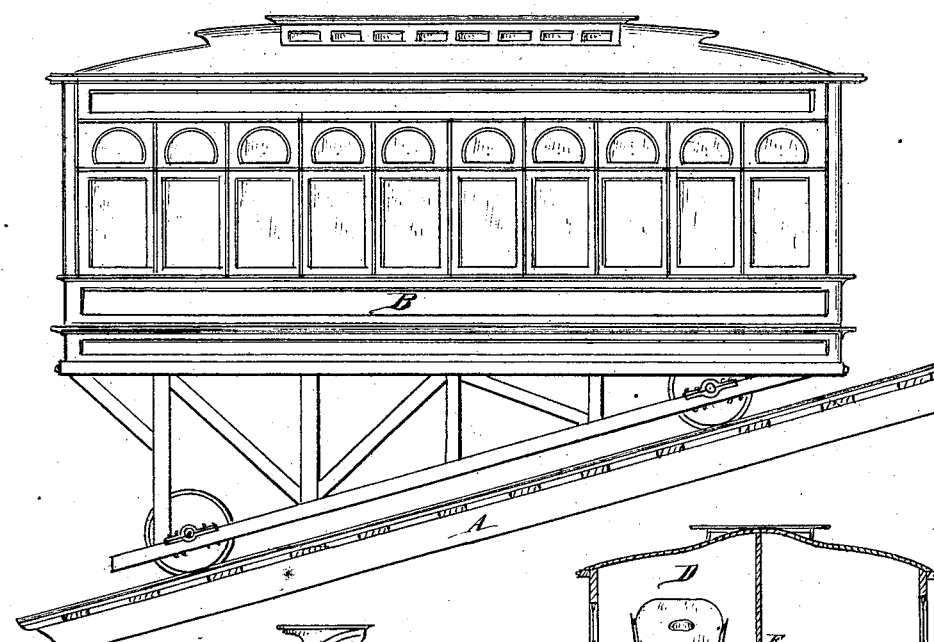
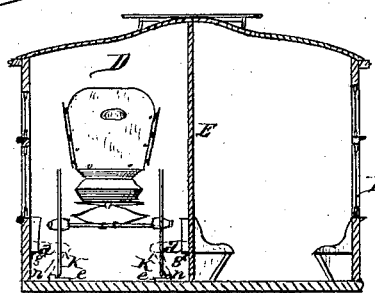
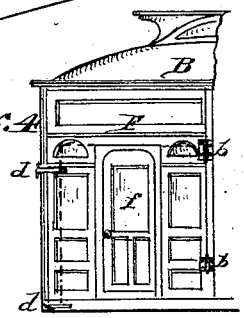
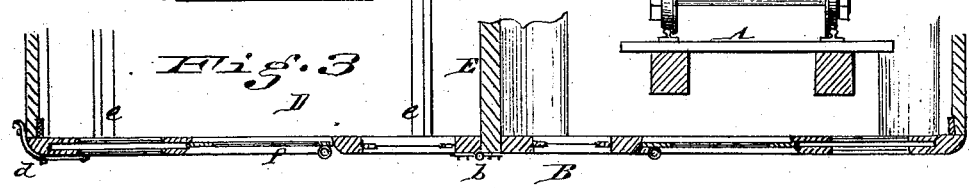
Attest
D. P. Kennedy
O. A. Dressel
Inventor
Joseph Earnshaw
per Wm. Hubbell Fisher,
his atty in fact

UNITED STATES PATENT OFFICE.

JOSEPH EARNSHAW, OF CINCINNATI, OHIO.

IMPROVEMENT IN CARS FOR INCLINED PLANES.

Specification forming part of Letters Patent No. 162,358, dated April 20, 1875; application filed February 3, 1875.

*To all whom it may concern:*

Be it known that I, JOSEPH EARNSHAW, a resident of the city of Cincinnati, in the State of Ohio, have invented certain new and useful Improvements in Carriages for Inclined Planes, of which the following is a specification:

My improvements relate to that class of carriages which are used upon inclined planes, and contemplate the simultaneous conveyance of passengers, equestrians, vehicles, and the like.

These improvements consist, first, in the arrangement of two compartments—one for the conveyance of passengers, the other mainly for the conveyance of vehicles, persons on horseback, and live stock—the two compartments being arranged alongside of each other, and their floors being about in the same plane.

By this arrangement the passengers in the one compartment, and the vehicles or whatever is carried in the other, are received into their respective compartments on the same plane, and are also discharged upon the same plane.

Heretofore a plan has been attempted to accomplish the conveyance of passengers and vehicles in the following manner: A single truck was provided, and two compartments—one for passengers, the other for vehicles, &c., and capable of being placed, one at a time, upon said truck. When it was desired to convey passengers, the passenger-compartment was rolled upon the truck. When it was necessary to convey vehicles, the passenger-compartment was removed, and the vehicle-compartment substituted. The second part of my improvements consists in such an arrangement of doors and track in the compartment for the occupancy of vehicles and the like as shall thereby enable the said compartment to more effectively accomplish the purposes of its construction. The third part of my invention consists in certain devices whereby the compartment ordinarily used for the conveyance of vehicles and the like can, when desired, be immediately converted into a compartment for the use of passengers, and then, when desired, be immediately reconverted into a compartment for the use of vehicles and the like. By these improvements I am better enabled to subserve the necessities and wants of travel.

In the accompanying drawing, Figure 1 is a side elevation of a portion of an inclined plane. Fig. 2 is a sectional end view of an inclined-plane railroad-carriage, showing both compartments of the car, and the partition in the center of the same, and showing a buggy in the vehicle-compartment, and also the adjustable seats for passengers when there are no vehicles in that compartment. Fig. 3 is a view showing in section the lower frame of a carriage such as described; and Fig. 4 is a sectional end view taken through the center of the carriage, showing the doors or entrances to the carriage.

A represents a section of an inclined-plane railroad of the usual construction. B indicates the combination-carriage. C is the compartment of the car to be occupied by passengers. D is the compartment of the car which is to be used for the carrying up and down of vehicles, horses, &c., and is separated from the other compartment by a partition, E, running through, preferably, the center of the car B. $a\ a$ are adjustable seats, which operate in the following manner: They are hinged on their under side K to the side of the compartment, and work easily on the hinge $g$. The seats, when in position, are held up by props $n$, which, when not in place, lie along the seat parallel to the length thereof. These props are pulled out when the seats are required, and when in position sustain the seat. The seats, when not in use, are dropped down alongside the compartment, and come close to the side of the compartment. $e\ e$ are rail-plates to keep the wheels of carriages in place, and prevent collision with the sides of the compartment in driving in or out of the carriage. F is the door or gate, swung on hinges $b\ b$ to the partition E, and fastened by catches or hooks $d\ d$ to the outside of the carriage. In the center of the gate, F is a small sliding door, $f$, of the usual form used in street-cars. This gate F is fitted with glass windows, and finished in style like that $f'$ in each end of the passenger-compartment.

The way in which my improved carriage operates is simple and convenient. When the carriage is at the starting-point, either on top of the plane or at the foot thereof, the hinged gate or door F is opened, and the vehicles, horses, live stock, &c., driven into the compartment D of the rail-plates *e e*, keeping the wheels of the vehicles in place, and from rubbing against the sides of the compartment. The vehicles, &c., remain in this position until either the foot or top of the plane is reached, as the case may be. Then the gate is opened and the vehicles, &c., driven out of compartment D, and at the same time, the door F' of compartment C being opened, the passengers pass out of the latter compartment, the passengers, vehicles, and the like, being discharged on the same plane. Thus horses and other stock of any description can be conveyed without inconvenience to the passengers. The seats in the compartment D are adjustable, and can be put into position or dropped down by means of the prop *n*, attached to the under side thereof. The seats are preferably made as shown in the drawing, and also preferably extend along the entire length of the compartment D.

What I claim as new, and desire to secure by Letters Patent, is—

1. A car for inclined planes, consisting of compartments, side by side, upon a common truck, one compartment, C, being provided with seats, and the other compartment provided with rail-plates *e*, and adapted for vehicles or live stock, substantially as and for the purposes set forth.

2. In a car for inclined planes, the combination, with the compartment C, of the compartment D, provided with folding seats *a a*, for converting it into a passenger-car, substantially as set forth.

JOSEPH EARNSHAW.

Attest:
   D. P. REINODY,
   H. L. COOPER.